United States Patent
Yin et al.

(10) Patent No.: US 11,284,095 B2
(45) Date of Patent: *Mar. 22, 2022

(54) HIGH PRECISION UP-SAMPLING IN SCALABLE CODING OF HIGH BIT-DEPTH VIDEO

(71) Applicant: DOLBY LABORATORIES LICENSING CORPORATION, San Francisco, CA (US)

(72) Inventors: Peng Yin, Ithaca, NY (US); Taoran Lu, Santa Clara, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,843

(22) Filed: Mar. 19, 2021

(65) Prior Publication Data

US 2021/0281866 A1    Sep. 9, 2021

Related U.S. Application Data

(63) Continuation of application No. 16/580,820, filed on Sep. 24, 2019, now Pat. No. 10,958,922, which is a
(Continued)

(51) Int. Cl.
*H04N 19/33*      (2014.01)
*H04N 19/105*     (2014.01)
(Continued)

(52) U.S. Cl.
CPC .......... *H04N 19/33* (2014.11); *H04N 19/105* (2014.11); *H04N 19/59* (2014.11); *H04N 19/80* (2014.11)

(58) Field of Classification Search
None
See application file for complete search history.

(56) References Cited

U.S. PATENT DOCUMENTS 7,215,831 B2 *   5/2007   Altunbasak ............... G06T 3/40
                                                  375/240
7,956,930 B2     6/2011   Sullivan
(Continued)

FOREIGN PATENT DOCUMENTS

CN    1455349     11/2003
CN    101366281    2/2009
(Continued)

OTHER PUBLICATIONS

"Joint Call for Proposals on Scalable Video Coding Extensions of High Efficiency Video Coding (HEVC)", MPEG doc. w12957, Jul. 2012, Stockholm, Sweden.
(Continued)

*Primary Examiner* — Stefan Gadomski

(57) ABSTRACT

The precision of up-sampling operations in a layered coding system is preserved when operating on video data with high bit-depth. In response to bit-depth requirements of the video coding or decoding system, scaling and rounding parameters are determined for a separable up-scaling filter. Input data are first filtered across a first spatial direction using a first rounding parameter to generate first up-sampled data. First intermediate data are generated by scaling the first up-sampled data using a first shift parameter. The intermediate data are then filtered across a second spatial direction using a second rounding parameter to generate second up-sampled data. Second intermediate data are generated by scaling the second up-sampled data using a second shift parameter. Final up-sampled data may be generated by clipping the second intermediate data.

8 Claims, 2 Drawing Sheets

Related U.S. Application Data continuation of application No. 16/168,644, filed on Oct. 23, 2018, now Pat. No. 10,516,889, which is a continuation of application No. 14/649,198, filed as application No. PCT/US2013/073006 on Dec. 4, 2013, now Pat. No. 10,165,288.

(60) Provisional application No. 61/745,050, filed on Dec. 21, 2012.

(51) Int. Cl.
*H04N 19/59* (2014.01)
*H04N 19/80* (2014.01)

(56) References Cited

U.S. PATENT DOCUMENTS

| | | | |
|---|---|---|---|
| 7,961,963 | B2 | 6/2011 | Sun |
| 8,880,571 | B2 | 11/2014 | Srinivasan |
| 9,571,856 | B2 | 2/2017 | Sun |
| 2003/0194011 | A1 | 10/2003 | Srinivasan |
| 2005/0180628 | A1 | 8/2005 | Curry |
| 2006/0126962 | A1 | 6/2006 | Sun |
| 2006/0209959 | A1 | 9/2006 | Sun |
| 2006/0210185 | A1 | 9/2006 | Sun |
| 2007/0019731 | A1 | 1/2007 | Huang |
| 2007/0047651 | A1 | 3/2007 | Kim |
| 2007/0160153 | A1 | 7/2007 | Sullivan |
| 2008/0101467 | A1 | 5/2008 | MacMullan |
| 2008/0232452 | A1 | 9/2008 | Sullivan et al. |
| 2010/0020866 | A1* | 1/2010 | Marpe .............. H04N 19/36 375/240.02 |
| 2010/0260260 | A1 | 10/2010 | Wiegand |
| 2011/0007802 | A1 | 1/2011 | Karczewicz |
| 2011/0090959 | A1* | 4/2011 | Wiegand .............. H04N 19/82 375/240.12 |
| 2012/0014455 | A1 | 1/2012 | Joshi |
| 2012/0089655 | A1 | 4/2012 | Erinjippurath |
| 2012/0213296 | A1 | 8/2012 | Sun |
| 2012/0314965 | A1 | 12/2012 | Kashiwagi |
| 2013/0010865 | A1 | 1/2013 | Coban |
| 2013/0034158 | A1 | 2/2013 | Kirchhoffer |
| 2013/0301738 | A1 | 11/2013 | Kim |
| 2013/0329782 | A1 | 12/2013 | Seregin |
| 2014/0140401 | A1 | 5/2014 | Lee |
| 2015/0103900 | A1 | 4/2015 | Liu |

FOREIGN PATENT DOCUMENTS

| | | | |
|---|---|---|---|
| CN | 101449476 | | 6/2009 |
| CN | 102176748 | | 3/2013 |
| EP | 1353514 | | 10/2003 |
| JP | 2008533908 | | 8/2008 |
| KR | 1020080092425 | | 10/2008 |
| RU | 2337503 | | 10/2008 |
| TW | 200737987 | | 10/2007 |
| TW | 201021576 | | 6/2010 |
| TW | 201110691 | | 3/2011 |
| TW | 201119396 | | 6/2011 |
| WO | 2010027634 | | 3/2010 |
| WO | 2012048052 | | 4/2012 |
| WO | WO-2012125532 A1 * | 9/2012 | ........... H04N 19/619 |

OTHER PUBLICATIONS

Bross, B. et al "High Efficiency Video Coding (HEVC) Text Specification Draft 9", ITU-T/ISO/IEC Joint Collaborative Team on Video Coding (JCT-VC) document JCTVC-K1003, Oct. 2012.
Chen, J. et al. "A Proposal for Scalable HEVC Test Model", JCTVC-K0348, Oct. 2012.
ITU-T and ISO/IEC JTC 1, Advanced Video Coding for Generic Audio-Visual Services, ITU T Rec. H.264 and ISO/IEC 14496-10 (AVC) Mar. 2010.
Misra, K. et al "Description of Scalable Video Coding Technology Proposal by Sharp", JCT-VC K0031, 11th Meeting, Shanghai, CN, Oct. 10-19, 2012.
SMuC0.1.1 software for SHVC (scalable extension of HEVC): https://hevc.hhi.fraunhofer.de/svn/svn_SMuCSoftware/tags/0.1.1/.
Symes P. D. "Ten-Bit Processing in an 8-Bit Environment" SMPTE Motion Imaging Journal, Society of Motion Picture and Television Engineers, White Plains, NY, vol. 98, No. 6, Jun. 1, 1989, pp. 444-446.

* cited by examiner

HIGH PRECISION UP-SAMPLING IN SCALABLE CODING OF HIGH BIT-DEPTH VIDEO

CROSS-REFERENCE TO RELATED APPLICATIONS

This application is a continuation of U.S. patent application Ser. No. 16/580,820, filed on Sep. 24, 2019, which is a continuation of U.S. patent application Ser. No. 16/168,644, filed on Oct. 23, 2018, now U.S. patent Ser. No. 10,516,889, which is a continuation of U.S. patent application Ser. No. 14/649,198, filed on Jun. 2, 2015, now U.S. Pat. No. 10,165,288, which is the national stage entry of PCT/US2013/073006, filed on Dec. 4, 2013, which claims the benefit of priority to U.S. Provisional Patent Application No. 61/745,050, filed on 21 Dec. 2012, each of which is hereby incorporated by reference in its entirety.

TECHNOLOGY

The present invention relates generally to images. More particularly, an embodiment of the present invention relates to high precision up-sampling in scalable video codecs for high bit-depth video.

BACKGROUND

Audio and video compression is a key component in the development, storage, distribution, and consumption of multimedia content. The choice of a compression method involves tradeoffs among coding efficiency, coding complexity, and delay. As the ratio of processing power over computing cost increases, it allows for the development of more complex compression techniques that allow for more efficient compression. As an example, in video compression, the Motion Pictures Expert Group (MPEG) from the International Standards Organization (ISO) has continued improving upon the original MPEG-1 video standard by releasing the MPEG-2, MPEG-4 (part 2), and H.264/AVC (or MPEG-4, part 10) coding standards.

Despite the compression efficiency and success of H.264, a new generation of video compression technology, known as High Efficiency Video Coding (HEVC), in now under development. HEVC, for which a draft is available in "High efficiency video coding (HEVC) text specification draft 9," ITU-T/ISO/IEC Joint Collaborative Team on Video Coding (JCT-VC) document JCTVC-K1003, October 2012, by B. Bross, W.-J. Han, G. J. Sullivan, J.-R. Ohm, and T. Wiegand, which is incorporated herein by reference in its entirety, is expected to provide improved compression capability over the existing H.264 (also known as AVC) standard, published as, "Advanced Video Coding for generic audio-visual services," ITU T Rec. H.264 and ISO/IEC 14496-10, which is incorporated herein in its entirety.

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1090×1080p). Ultra high-definition (UHD) is a next generation resolution format with at least a 3,840×2,160 resolution. Ultra high-definition may also be referred to as Ultra HD, UHDTV, or super high-vision. As used herein, UHD denotes any resolution higher than HD resolution.

Another aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

As used herein, the term image or video "bit-depth" denotes the number of bits used to represent or store pixel values of a color component of an image or video signal. For example, the term N-bit video (e.g., N=8) denotes that pixel values of a color component (e.g., R, G, or B) in that video signal may take values within the range 0 to $2^N-1$.

As used herein, the term "high bit-depth" denotes any bit-depth values larger than 8 bits (e.g., N=10 bits). Note that while HDR image and video signals are typically associated with high bit-depth, a high bit-depth image may not necessarily have a high dynamic range. Hence, as used herein, high bit-depth imaging may be associated with both HDR and SDR images.

To support backwards compatibility with legacy playback devices as well as new display technologies, multiple layers may be used to deliver UHD and HDR (or SDR) video data from an upstream device to downstream devices. Given such a multi-layer stream, legacy decoders may use the base layer to reconstruct an HD SDR version of the content. Advanced decoders may use both the base layer and the enhancement layers to reconstruct an UHD EDR version of the content to render it on more capable displays. As appreciated by the inventors here, improved techniques for the coding of high bit-depth video using scalable codecs are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

High-precision up-sampling in scalable coding of video inputs with high bit-depth is described herein. Given parameters related to the bit-depth of intermediate results, the internal input bit-depth, and filter precision bit-depth, scaling and rounding factors are determined to preserve accuracy of operations and prevent overflow.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to high-precision up-sampling in layered coding and decoding of video signals with high bit-depth. In response to bit-depth requirements of the video coding or decoding system, the input data, and the filtering coefficients, scaling and rounding parameters are determined for a separable up-scaling filter. Input data are first filtered across a first spatial direction using a first rounding parameter to generate first up-sampled data. First intermediate data are generated by scaling the first up-sampled data using a first shift parameter. The intermediate data are then filtered across a second spatial direction using a second rounding parameter to generate second up-sampled data. Second intermediate data are generated by scaling the second up-sampled data using a second shift parameter. Final up-sampled data may be generated by clipping the second intermediate data.

High-Precision Separable Up-Sampling

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or higher bit-depth in a scalable format.

Figure 1:
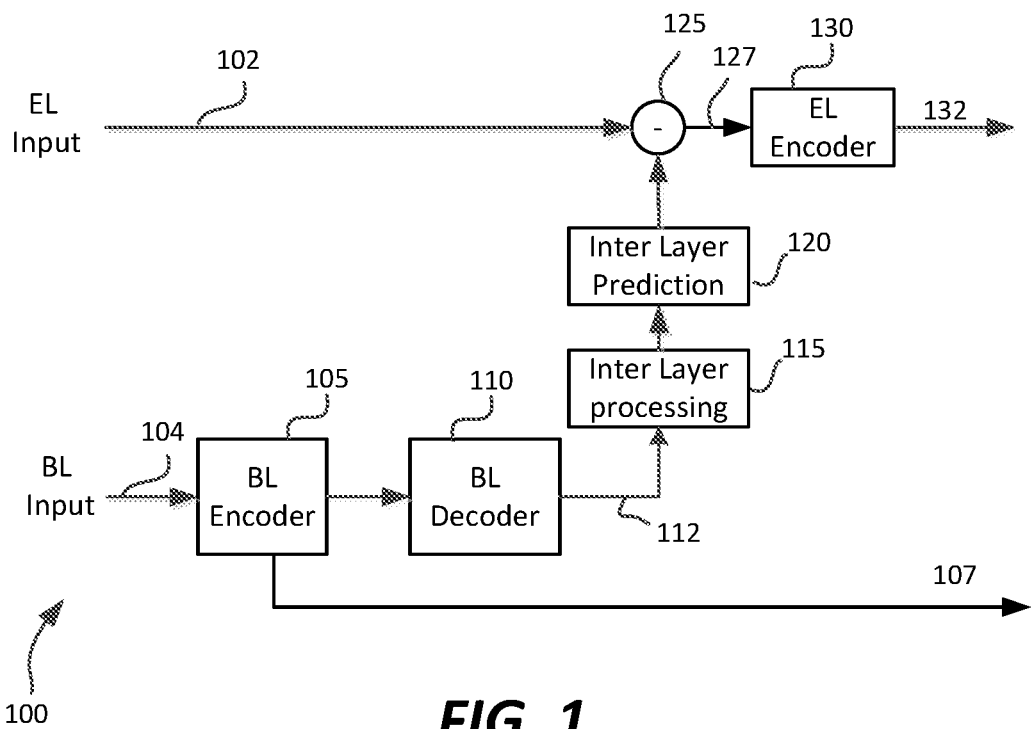
FIG. 1 depicts an example implementation of a scalable coding system according to an embodiment of this invention.

FIG. 1 depicts an embodiment of an example implementation of a scalable encoding system. In an example embodiment, base layer (BL) input signal 104 may represent an HD SDR signal and enhancement layer (EL) input 102 may represent an UHD HDR (or SDR) signal at a high bit-depth. The BL input 104 is compressed (or encoded) using BL Encoder 105 to generate coded BL bitstream 107. BL encoder 105 may compress or encode BL input signal 104 using any of the known or future video compression algorithms, such as MPEG-2, MPEG-4, part 2, H.264, HEVC, VP8, and the like.

Given BL input 104, encoding system 100 generates not only coded BL bitstream 107 but also BL signal 112 which represents the BL signal 107 as it will be decoded by a corresponding receiver. In some embodiments, signal 112 may be generated by a separate BL decoder (110) following BL encoder 105. In some other embodiments, signal 112 may be generated from the feedback loop used to perform motion compensation in BL encoder 105. As depicted in FIG. 1, signal 112 may be processed by inter-layer processing unit 115 to generate a signal suitable to be used by inter-layer prediction process 120. In some embodiments, inter-layer processing unit 115 may up-scale signal 112 to match the spatial resolution of EL input 102 (e.g., from an HD resolution to an UHD resolution). Following inter-layer prediction 120, a residual 127 is computed, which is subsequently coded by an EL encoder 132 to generate coded EL bitstream 132. BL bitstream 107 and EL bitstream 132 are typically multiplexed into a single coded bitstream which is transmitted to suitable receivers.

Figure 2:
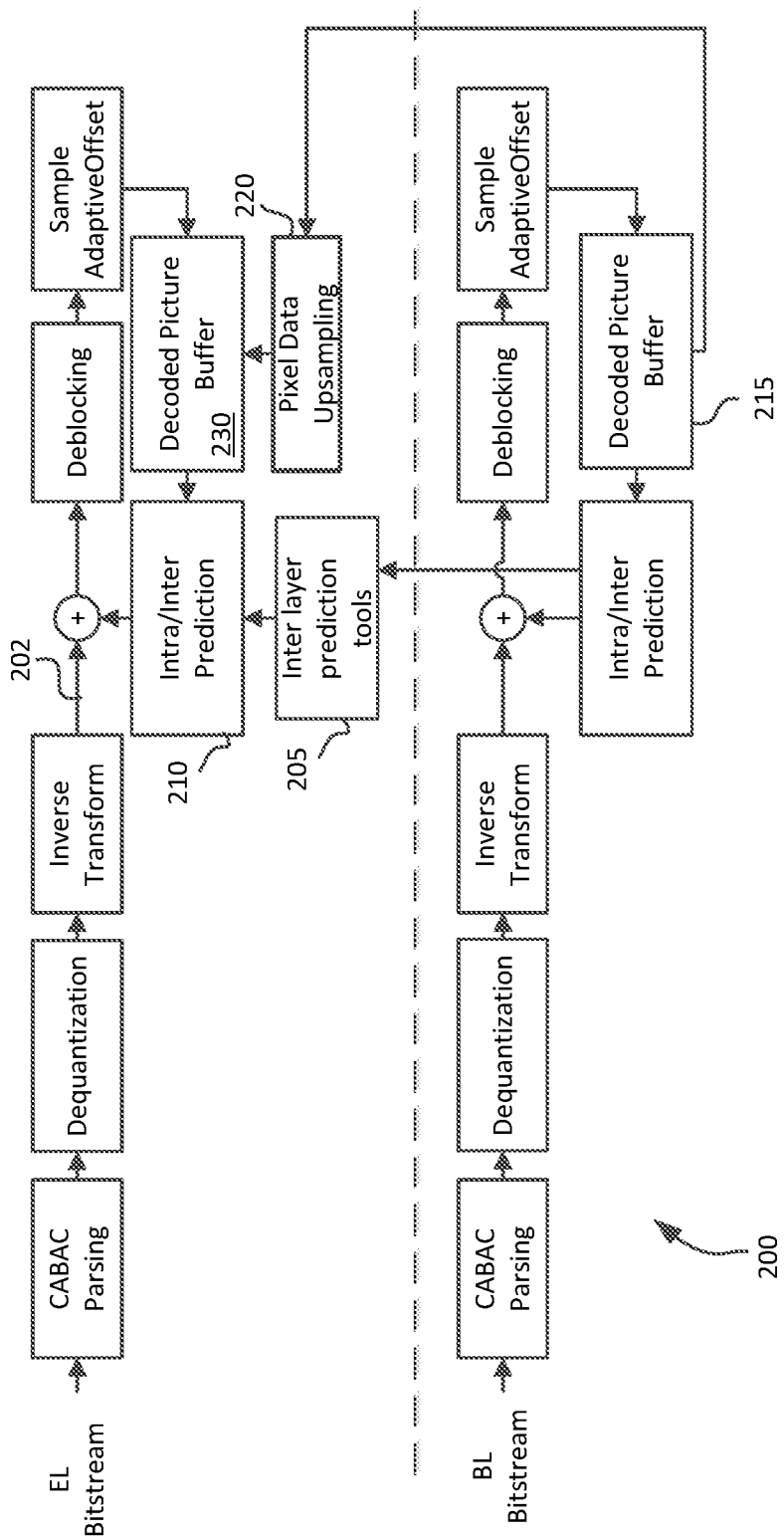
FIG. 2 depicts an example implementation of a scalable decoding system according to an embodiment of this invention.

The term SHVC denotes a scalable extension of a new generation of video compression technology known as High Efficiency Video Coding (HEVC) [1], which enables substantially higher compression capability than the existing AVC (H.264) standard [2]. SHVC is currently being developed jointly by the ISO/IEC MPEG and ITU-T WP3/16 groups. One of the key aspects of SHVC is spatial scalability, where inter-layer texture prediction (e.g., 120 or 210) provides the most significant gain. An example of an SHVC decoder is shown in FIG. 2. As part of inter-layer prediction, an up-sampling process (220) up-samples or up-converts pixel data from the base layer (215) to match the pixel resolution of the data received in the enhancement layer (e.g. 202 or 230). In an embodiment, the up-sampling process may be performed by applying an up-sampling or interpolation filter. In Scalable extension of H.264 (SVC) or SHVC SMuC0.1.1 software [3], a separable poly-phase up-sampling/interpolation filter is applied. While such filters perform well with input data with standard bit depth (e.g., images using 8 bits per pixel, per color component), they may overflow for input data with high bit-depth (e.g., images using 10 bits or more per pixel, per color component).

In 2D up-sampling or interpolation processes, a common practice is to apply separable filters to reduce processing complexity. Such filter up-sample an image first in one spatial direction (e.g., horizontal or vertical) and then in the other direction (e.g., vertical or horizontal). Without loss of generality, in the following description, it is assumed vertical up-sampling follows horizontal up-sampling. Then, the filtering process can be described as:

Horizontal Up-Sampling:

$$tempArray[x,y]=\Sigma_{i,j}(eF[xPhase,i]*refSampleArray[xRef+j,y]) \quad (1)$$

Vertical Up-Sampling $$predArray[x,y]=Clip((\Sigma_{i,j}(eF[yPhase,i]*tempArray[x,yRef+j])+offset)>>nshift) \quad (2)$$

where eF stores the poly-phase up-sampling filter coefficients, refSampleArray contains reference sample values from the reconstructed base layer, tempArray stores the intermediate value after the first 1-D filtering, predArray stores the final value after the second 1D filtering, xRef and yRef correspond to the relative pixel position for up-sampling, nshift denotes a scaling or normalization parameter, offset denotes a rounding parameter, and Clip( ) denotes a clipping function. For example, given data x and threshold values A and B, in an example embodiment, function y=Clip(x, A, B) denotes $$y = \begin{cases} x, & \text{if } A < x < B \\ A, & \text{if } x \leq A \\ B, & \text{if } x \geq B \end{cases}$$

For example, for N-bit image data, examples values of A and B may comprise A=0 and B=$2^N$−1.

In equation (2), the operation a=b>>c denotes that b is divided by $2^c$ (e.g., a=b/$2^c$) by shifting a binary representation of b to the right by c bits. Note that in equation (1), for first stage filtering, no clipping or shift operations are applied. Note also that under this implementation, the order of horizontal and vertical filtering does not matter. Applying vertical filtering first and then horizontal filtering yields the same results as applying horizontal filtering first and then vertical filtering.

In SMuC0.01 [3], the filter precision (denoted as US_FILTER_PREC) of eF is set to 6 bits. When the internal bit-depth of refSampleArray is 8 bits, then tempArray may be kept within the target implementation bit depth (e.g. 14 or 16 bits). But when the internal bit-depth of refSampleArray is more than 8 bits (e.g., 10 bits), then the output of equation (1) may overflow.

In an embodiment, such overflow may be prevented by: (a) fixing the order of operations in the up-sampling process, and (b) by incorporating intermediate scaling operations. In an embodiment, when horizontal filtering is followed by vertical filtering, up-sampling may be implemented as follows:

Horizontal Up-Sampling:

$$tempArray[x,y]=(\Sigma_{i,j}(eF[xPhase,i]*refSampleArray[xRef+j,y]+iOffset1))>>nShift1 \quad (3)$$

Vertical Up-Sampling $$predArray[x,y]=Clip((\Sigma_{i,j}(eF[yPhase,i]*tempArray[x,yRef+j])+iOffset2)>>nShift2), \quad (4)$$

Without loss of generality, let INTERM_BITDEPTH denote the bit-depth (or bit resolution) requirement for intermediate filter processing; that is, no result can be represented in more bits than INTERM_BITDEPTH (e.g. INTERM_BITDEPTH=16). Let INTERNAL_INPUT_BITDEPTH denote the bit-depth used for representing in the processor the input video signal. Note that INTERNAL_INPUT_BITDEPTH may be equal or larger than the original bit-depth of the input signal. For example, in some embodiments, 8-bit input video data may be represented internally using INTERNAL_INPUT_BITDEPTH=10. Alternatively, in another example, 14-bit input video may be represented with INTERNAL_INPUT_BITDEPTH=14.

In one embodiment, the scaling parameters in equations (3) and (4) may be computed as $$nShift1=(US\_FILTER\_PREC+INTERNAL\_INPUT\_BITDEPTH)-INTERM\_BITDEPTH \quad (5)$$

$$nShift2=2*US\_FILTER\_PREC-nShift1. \quad (6)$$

In an embodiment, nShift1 and nShift2 values may not be allowed to be negative. For example, a negative value for nShift1 indicates that the bit resolution allowed for intermediate results is more than adequate to prevent overflow; hence, when negative, nShift1 may be set to zero.

If rounding is used in both (3) and (4) (highest complexity, highest precision):

$$iOffset1=1<<(nShift1-1), \quad (7)$$

$$iOffset2=1<<(nShift2-1), \quad (8)$$

where a=1<<c denotes a binary left shift of "1" by c bits, that is, a=$2^c$.

Alternatively, when no rounding is used in both (3) and (4) (lowest complexity, lowest precision):

$$iOffset1=0, \quad (9)$$

$$iOffset2=0. \quad (10)$$

Alternatively, if rounding is used in (3) but not used in (4):

$$iOffset1=1<<(nShift1-1), \quad (11)$$

$$iOffset2=0. \quad (12)$$

Alternatively, if rounding is used in (4) but not used in (3) (which is common):

$$iOffset1=0, \quad (13)$$

$$iOffset2=1<<(nShift2-1); \quad (14)$$

In an example embodiment, let INTERM_BITDEPTH=14, US_FILTER_PREC=6, and INTERNAL_INPUT_BITDEPTH=8, then, from equations (5) and (6), nShift1=0 and nShift2=12. In another example, for US_FILTER_PREC=6, if INTERNAL_INPUT_BITDEPTH=10, and INTERM_BITDEPTH=14, then nShift1=2 and iOffset1=0 or 2, depending on the selected rounding mode. In addition, nShift2=10 and iOffset2=0 or $2^9$, depending on the selected rounding mode.

Note that using the implementation depicted in equations (3) and (4), vertical filtering followed by horizontal filtering may yield different results than horizontal filtering followed by vertical filtering, hence. in a decoder, the proper filtering may be either be fixed and predetermined by all decoders (e.g., by a decoding standard or specification), or in some embodiments the proper order may be signal by an encoder to the decoder using an appropriate flag in metadata.

Figure 3:
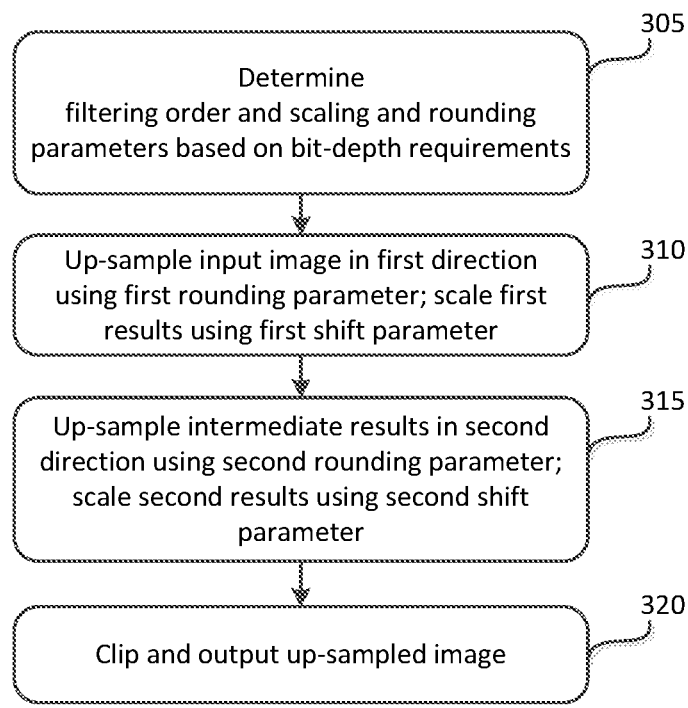
FIG. 3 depicts an example process for image data up-sampling according to an embodiment of this invention.

FIG. 3 depicts an example process for image data up-sampling according to an embodiment of this invention. First (305), the encoder or decoder in the layered coding system determines the proper filtering order (e.g., horizontal filtering followed by vertical filtering) and the scaling and rounding parameters. In an embodiment, scaling and rounding parameters may be determined according to equations (5)-(14) based on the required bit depths for intermediate storage (e.g., INTERM_BITDEPTH), filter coefficients (e.g., US_FILTER_PREC) and internal input representation (e.g., INTERNAL_INPUT_BITDEPTH). At step 310, image data are up-sampled in a first direction (e.g., horizontal). The output results of this stage are rounded and scaled before intermediate storage using a first shift parameter (e.g., nShift1) and a first rounding parameter (e.g., iOffset1). Next (315), the intermediate results are up-sampled in the second direction (e.g., vertical). The output results of this stage are rounded and scaled using a second shift parameter (e.g., nShift2) and a second rounding parameter (e.g., iOffset2). Finally (320), the output data of the second stage is clipped before final output or storage.

The methods described herein may also be applicable to other imaging applications that employ separable filtering of high bit-depth image data, such as down-scaling, noise filtering, or frequency transforms.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to high-precision up-sampling, such as those described herein. The computer and/or IC may compute any of a variety of parameters or values that relate to high-precision up-sampling as described herein. The encoding and decoding embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to high-precision up-sampling as described above by executing software instructions in a program memory accessible to the processors. The invention may also be provided in the form of a program product. The program product may comprise any tangible medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to high-precision up-sampling in scalable coding of high bit-depth video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

REFERENCES

[1] B. Bross, W.-J. Han, G. J. Sullivan, J.-R. Ohm, and T. Wiegand, "High efficiency video coding (HEVC) text specification draft 9," ITU-T/ISO/IEC Joint Collaborative Team on Video Coding (JCT-VC) document JCTVC-K1003, October 2012.

[2] ITU-T and ISO/IEC JTC 1, "Advanced Video Coding for generic audio-visual services," ITU T Rec. H.264 and ISO/IEC 14496-10 (AVC)

[3] SMuC0.1.1 software for SHVC (scalable extension of HEVC): https://hevc.hhi.fraunhofer.de/svn/svn_SMuCSoftware/tags/0.1.1/.

What is claimed is:

1. An apparatus for re-sampling image data in a scalable video system, the apparatus comprising:
an input for receiving image data; and
a processor for processing the image data, wherein the processor:
determines scaling and rounding parameters in response to bit-depth requirements of the scalable video system;
generates first re-sampled data by filtering image data from a first layer, wherein filtering of the image data from the first layer is performed across a first spatial direction with zero rounding;
generates first intermediate data by scaling the first re-sampled data with a first shift parameter;
generates second re-sampled data by filtering the first intermediate data, wherein the filtering of the first intermediate data is performed across a second spatial direction using a rounding parameter;
generates second intermediate data by scaling the second re-sampled data with a second shift parameter; and
generates output re-sampled data for a second layer by clipping the second intermediate data,
wherein determining the rounding parameter comprises computing $$\text{offset}=1<<(n\text{Shift2}-1),$$

wherein offset is the rounding parameter, << denotes a binary shift to the left, and nShift2 is the second shift parameter.

2. The apparatus of claim 1, wherein the scalable video system comprises a video encoder.

3. The apparatus of claim 1, wherein the scalable video system comprises a video decoder.

4. The apparatus of claim 1, wherein determining the first shift parameter comprises adding to the bit depth value of the image data in the first layer the difference of an intermediate processing bit precision from a filtering bit precision.

5. The apparatus of claim 4, wherein given an intermediate processing bit precision of 14 bits and a filtering bit precision of 6 bits:

$$n\text{Shift1} = \text{bitdepth} + (6-14) = \text{bitdepth} - 8,$$

where nShift1 denotes the first shift parameter, and bitdepth denotes the bit depth value of the image data in the first layer.

6. The apparatus of claim 1, wherein the rounding parameter is zero.

7. The apparatus of claim 1, wherein the first spatial direction is a horizontal direction and the second spatial direction is a vertical direction.

8. The apparatus of claim 1, wherein the first spatial direction is a vertical direction and the second spatial direction is a horizontal direction.

* * * * *